Figure 1:
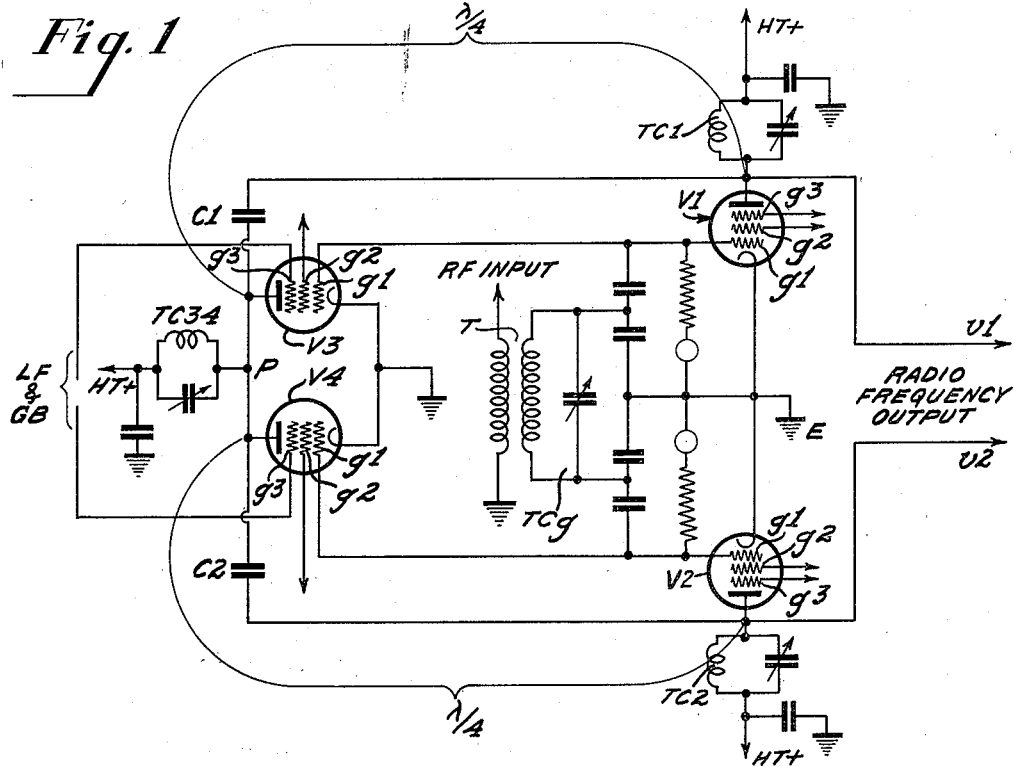

Jan. 16, 1951

T. H. PRICE 2,538,535

RADIO TRANSMITTER

Filed June 27, 1947

INVENTOR.
Thomas H. Price
BY Harry Tunick
ATTORNEY.

Patented Jan. 16, 1951

2,538,535

UNITED STATES PATENT OFFICE 2,538,535

RADIO TRANSMITTER

Thomas Henry Price, Chelmsford, England, assignor, by mesne assignments, to Radio Corporation of America, New York, N. Y., a corporation of Delaware Application June 27, 1947, Serial No. 757,609
In Great Britain April 17, 1946

Section 1, Public Law 690, August 8, 1946
Patent expires April 17, 1966

7 Claims. (Cl. 332—24)

This invention relates to radio-transmitters of the so-called phase-swing type, and provides an improvement in or modification of part of the phase-swing radio-transmitter described and claimed in United States Patent #2,381,181, dated August 7, 1945.

In the said patent, I have claimed a phase-swing radio-frequency transmitter, including two similar valves or valve-stages to the grids of which in operation high or radio frequency voltages are applied in predetermined phase relationship and in which during modulation, the phase positions of the voltages are caused to swing towards and away from each other about the unmodulated position respectively for positive and negative half-cycles of modulation voltage, the anode circuit of each valve including a tuned circuit, these tuned circuits being substantially similar to each other, and a power-absorbing device to which each tuned circuit is coupled by means of a quarter-wave impedance-inverting device or network, the arrangement being such that as a result of varying the said phase positions, the amplitude of the current delivered to the power-absorbing device is substantially linearly varied.

According to this invention, a phase-swing radio-transmitter includes a source of radio-frequency energy, a first and a second pair of thermionic valves, means including a tuned input circuit coupling said source to a control grid of all the valves so that the grid of a valve of each pair is energised in anti-phase with the grid of the other valve of the same pair, individual parallel tuned anode circuits for the valves of the first pair and a common parallel tuned anode circuit for the valves of the second pair, an output connection for each valve of the first pair, means for controlling the amount of radio-frequency energy each valve of the second pair contributes to the common tuned anode circuit, a pair of reactive coupling circuits each connecting the common tuned anode circuit to a different valve of the first pair the whole arrangement being such that the phases of resultant radio-frequency energies which appear in the two output connections swing about their phase positions towards and away from each other in response to differential variation of the amount of radio-frequency energy the valves of the second pair contribute to the common tuned circuit.

The means for controlling the amount of radio-frequency energy which each valve of the second pair contributes to the common tuned anode circuit may include a source of direct potential, adjustable so that each valve of the second pair contributes the same amount of radio-frequency energy to their common anode tuned circuit, and a source of modulation potentials for differentially varying said direct bias potential.

The two reactive coupling circuits may comprise capacitors, each of which in conjunction with the common tuned anode circuit for the second pair of valves and the individual tuned circuit of one of the valves of the first pair constitutes a quarter wave coupling circuit. Instead of capacitors, inductors may be used, D. C. blocking condensers being included.

The valves of the first pair, and the valves of the second pair may be pentodes, with the radio-frequency energy applied to the first or inner grid in each valve of each pair, the bias potentials for the valves of the second pair being applied to their third or outer grids.

Figure 2:
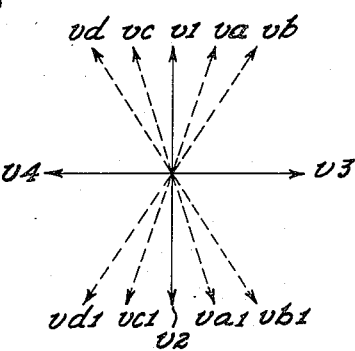

The invention is illustrated in the drawing in which Fig. 1 illustrates by circuit element and circuit element connection a modulator arranged in accordance with my invention and, Fig. 2 illustrates by vector diagram the mode of operation of the modulator of Fig. 1.

Fig. 1 shows a pair of valves V1 and V2, the first pair above referred to, each of which is a pentode and each of which is provided with a tuned anode circuit, respectively TC1 and TC2. A common tuned grid circuit TCg is provided for these valves and is coupled, by means of a transformer T, to a source of radio-frequency energy, not shown but indicated at RF. The secondary winding of tuned grid circuit TCg constitutes the inductive element of the tuned grid circuit, opposite ends of which are connected respectively to grids g1 of valves V1 and V2. The mid-point of the tuned grid circuit is connected to earth as indicated at E. Grids g2 and g3 of valve V1 and V2 are connected in conventional manner, to suitable biases. The tuned circuits are resonant at the frequency of the radio-frequency energy from RF and in consequence of the connections so far described, grids g1 of valves V1 and V2 are energised in anti-phase, and radio-frequency output may be taken from the connections v1 and v2, the two outputs being in anti-phase as indicated by vectors v1 and v2 in the vector diagram.

The anode of valve V1 is connected through a condenser C1 to a point P and the anode of valve V2 is connected through a condenser C2 to point P. Thus, since the radio-frequency potentials at these anodes are in anti-phase, and assuming that condensers C1 and C2 have been chosen or adjusted with due regard to their respective capacities, point P will be at zero radio-frequency potential relative to the anodes of valves V1 and V2.

The circuit diagram also shows another pair of valves V3 and V4, the second pair above referred to, each of which is a pentode, these valves being provided with a common tuned anode circuit TC34. Opposite ends of the tuned grid circuit TCg are connected respectively to grids g1 of valves V3 and V4. Grids g2 of valves V3 and V4 are connected, in conventional manner, to a source of bias potential, and grids g3 are connected to a source not shown but indicated at GB of adjustable bias potential, preferably so that the biases can be adjusted differentially. By reason of the connections described for valves V3 and V4, and assuming the biases on grids g3 of these valves are such, having regard to the parameters of the circuit elements, that the system is balanced, there will be no output at point P, from valves V3 and V4. A low-frequency potential from a source of such, not shown but indicated at LF is superimposed on bias GB so as differentially to vary the biases applied to grids g3 of valves V3 and V4. This low frequency potential may represent signals such as audio or music signals. As the biases on grids g3 of valves V3 and V4 are differentially varied an output will appear at point P, this output having a phase which is determined by which valve V3 or V4 is contributing the most radio-frequency energy to tuned circuit TC34 and an amplitude determined by the extent of un-balance produced by the low-frequency potentials. This output will be in phase with v1 or v2 as valve V3 or V4 is contributing the more radio frequency energy to point P.

The electrical dimension of condenser C1 is such, having regard to the electrical dimensions of tuned circuits TC1 and TC34, that these elements constitute a quarter-wave coupling circuit coupling point P to connection v1, and similarly for condenser C2, with regard to point P and connection v2. By reason of the quarter-wave nature of the coupling between point P and connections v1 and v2, the radio frequency potentials appearing at point P, which at that point are in phase with either v1 or v2, of the vector diagram and of a magnitude depending on the amplitude of the low-frequency potentials, will appear at connections v1 and v2 of the circuit diagram as indicated by vectors v3 or v4, that is in phase quadrature with potentials v1 and v2. There will thus be produced resultant potentials at the connections v1 and v2. Thus, if conditions of modulation are such that the radio-frequency potentials appearing at connections v1 and v2 from point P are represented by vector v3, v4 of course being absent, for varying amplitudes of the potential v3 the phase and amplitude of the resultant will have one of an infinitude of values, two of which are represented by the pairs of vectors va and va1, and vb and vb1. Similarly if conditions of modulation are such that the radio frequency potentials appearing at connections v1 and v2 from point P are represented by vector v4, v3 being absent, for varying amplitudes of potential v4, the phase and amplitude of the resultant will have one of an infinitude of values, two of which are represented by the pairs of vectors vc and vc1, and vd and vd1.

Valves V3 and V4, with their associated grid and anode circuits will be recognised as a conventional carrier suppressor arrangement which, when used in the complete circuit as shown in the circuit diagram, will constitute a simple and effective arrangement for providing two output potentials of controllable relative phase. To ensure a substantially linear relation between the phase variations and the potential represented at LF the amplitude of this low-frequency potential, and therefore of v3 and v4 must be kept within certain limits.

The circuit described in connection with the circuit diagram of Fig. 1 could replace the elements identified as RA, 10, and BR, in Figure 11 of the drawing of U. S. Patent #2,381,181. Thus a considerable saving in expense and simplification of the circuit arrangement would be effected. It is, of course, to be understood, that if it were desired to effect the phase control at a relatively low power level, conventional amplifying stages or cathode follower coupling stages could be interposed between the phase modulation circuit of the accompanying circuit diagram and power stage 6 of Figure 11 of the drawing accompanying the said patent specification.

It will be apparent, that since the effect of variation of the biases GB, by low frequency signals LF applied to the third grids of valves V3 and V4 is to swing the phases of outputs v1 and v2, phase positions other than anti-phase may be selected as the normal, unmodulated, condition merely by appropriate adjustment of the value of GB.

Moreover, by a simple addition to the circuit illustrated, in-phase amplitude modulation of outputs v1 and v2 may be provided. The circuit addition would be required to ensure that as the output of valve V3 or V4 predominates, the output of V1 and V2 should be reduced. In the limit, when the outputs of valves V1 and V2 have disappeared and valve V3 or V4 alone is supplying output, the phase of outputs v1 and v2 will be as v3 or v4 of the vector diagram. Thus the phase change of v1 and v2 can be made equal to 90°. The addition required to be made to the circuit will be apparent to those skilled in the art.

What is claimed is:

1. In a modulation system, a first pair of electron discharge devices each having input electrodes and having output electrodes in individual parallel tuned radio frequency circuits, a second pair of electron discharge devices each having input electrodes and having output electrodes connected to a common parallel tuned radio frequency circuit, means for directly applying radio frequency potentials in push pull relation to the input electrodes of the devices of each pair, means for modulating the gains of the devices of the second pair in accordance with signals, a separate phase displacing reactance coupling the output electrode of each device of the second pair to the output electrode of a different one of the devices of the first pair, and means for deriving output from the output electrodes of said first pair of devices.

2. In a modulation system, a first pair of electron discharge devices each having input electrodes and having output electrodes including an anode, a separate parallel tuned circuit coupled to each anode, a second pair of electron discharge devices each having an anode, a cathode and a control electrode, a source of alternating current to be modulated coupled differentially to the input electrodes of the devices of the first pair of devices and differentially to the control electrodes of the devices of the second pair of devices, a tuned circuit coupling the anodes of the second pair of devices in parallel, a separate phase shifting network coupling the anode of each device of the second pair to the anode of a different one of the devices of the first pair, apparatus for applying substantially like base biasing potentials to corresponding electrodes in said second pair of devices, and connections for applying modulation differentially to corresponding electrodes in the devices of said second pair of devices.

3. A system as recited in claim 2 wherein each of said phase shifting networks includes said last named tuned circuit and a different one of said first named tuned circuits.

4. A system as recited in claim 2 wherein said first corresponding electrodes are auxiliary control electrodes in said second pair of electron discharge devices.

5. A system as recited in claim 2 wherein said phase shifting networks have an electrical length substantially equal to one-quarter of the length of a wave of the frequency to which said tuned circuits are tuned.

6. In a modulation system, a source of radio-frequency energy, a first and a second pair of electron discharge devices each having an anode, a control electrode and a cathode, means including a common tuned input circuit coupling said source directly to a control electrode of each one of the devices so that the control electrode of a device of each pair is energized directly from said source anti-phasally with the control electrode of the other device of the same pair, separate parallel-tuned anode circuits for the devices of the first pair of devices, a common parallel-tuned anode circuit for the devices of the second pair of devices, an output connection for each device of the first pair of devices, means for controlling the amount of radio-frequency energy each device of the second pair of devices contributes to the common tuned anode circuit, and a separate reactive circuit coupling the anode of each device of the second pair to the anode of a different one of the devices of the first pair.

7. A modulation system as defined in claim 6, wherein the last-mentioned means includes a source of direct bias potential connected to corresponding electrodes in the second pair of devices, said potential being adjustable so that each device of the second pair contributes the same amount of radio-frequency energy to the common tuned anode circuit, and a source of modulation potentials for differentially varying said direct bias potential.

THOMAS HENRY PRICE.

REFERENCES CITED

The following references are of record in the file of this patent:

UNITED STATES PATENTS

| Number | Name | Date |
| --- | --- | --- |
| 2,250,296 | Crosby | July 22, 1941 |